Jan. 11, 1938.  R. W. SHOEMAKER  2,104,824
COMPOSITE BUS BAR
Filed Oct. 2, 1934  2 Sheets-Sheet 1
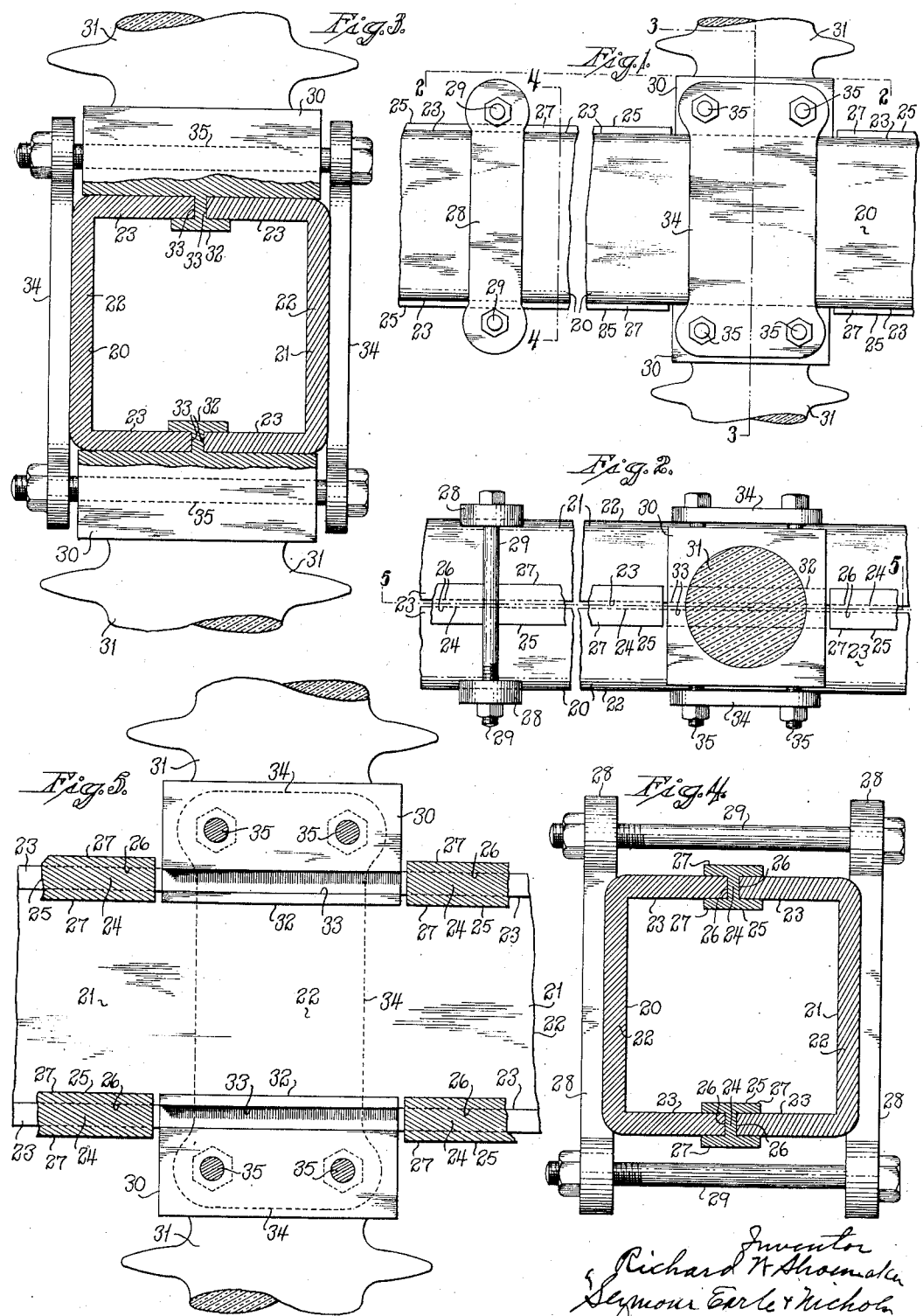

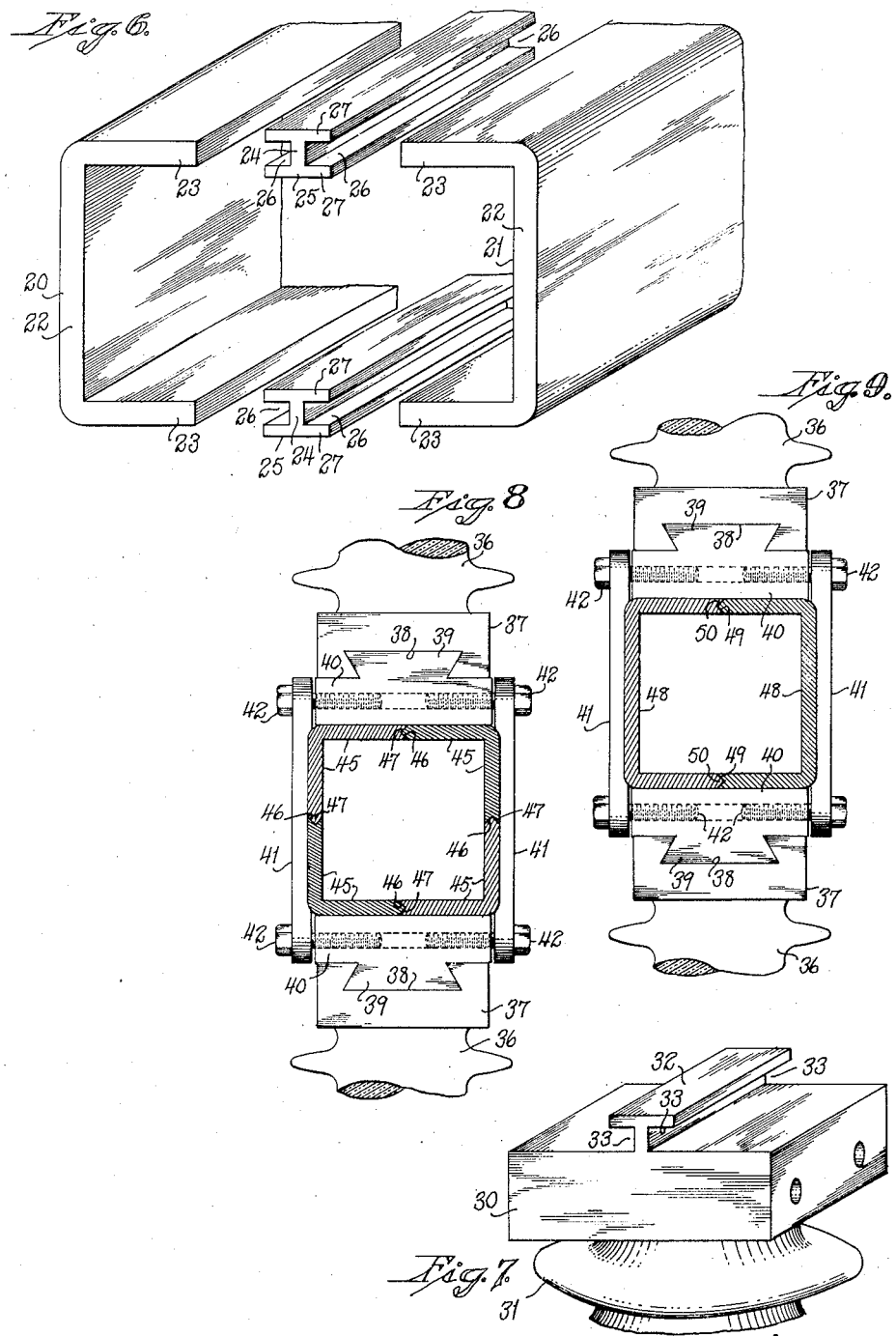

Patented Jan. 11, 1938

2,104,824

UNITED STATES PATENT OFFICE 2,104,824

COMPOSITE BUS-BAR

Richard W. Shoemaker, Waterbury, Conn., assignor to The Chase Companies, Incorporated, Waterbury, Conn., a corporation Application October 2, 1934, Serial No. 746,503

9 Claims. (Cl. 173—13)

This invention relates to bus-bars, and particularly to composite tubular bus-bars, i. e., bus-bars built up of a plurality of interengaged members organized into a tubular structure.

One of the main problems involved in the design and construction of composite tubular bus-bars for the conduction of heavy alternating currents is to provide sufficient transverse strength to effectively resist the very high collapsing forces tending to draw the parts of a composite bus-bar together when a short-circuit occurs. Under short-circuit conditions with a 60-cycle alternating current, the collapsing force would be of pulsating character exerting itself 120 times per second. Under some conditions, the collapsing force may rise as high as 5,000 lbs. per linear foot. It is largely with respect to effectively resisting the collapsing forces referred to that the present invention is concerned.

The problem of effectively cooling tubular bus-bars is one to which considerable attention has been heretofore given, but very complete tests have demonstrated that the cooling effects previously produced have been so small as to be almost negligible.

One of the objects of the present invention is to provide a composite tubular bus-bar having superior resistance to mechanical stresses set up by the occurrence of short circuits in the system of which it may form a part.

A further object is to provide a composite tubular bus-bar having superior resistance to vibration between its component parts under conditions of heavy electrical loads.

Another object is to provide a superior composite tubular bus-bar combining convenience of assembly and installation with relative freedom from lateral air leakage, whereby the bar may be effectively cooled by high-velocity air-currents moving longitudinally therethrough, substantially unhampered by the disturbing effects of lateral air leakage.

A still further object is to provide a superior composite bus-bar of tubular form in cross-section which is sufficiently strong to resist mechanical stresses occurring under short-circuit conditions without, however, requiring such interior supports as would materially obstruct the longitudinal flow of air-currents therethrough.

Another object is to provide a construction which effectively stabilizes a composite tubular bus-bar with respect to a suitable support, with capacity, however, for longitudinal expansion and contraction without disrupting the connection.

With the above and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a broken view in side elevation of a composite tubular bus-bar constructed in accordance with the present invention and shown as having attached thereto suitable insulators or supports;

Fig. 2 is a sectional view taken on the line 2—2 of Fig. 1;

Fig. 3 is a broken view in transverse section, taken partly on the line 3—3 of Fig. 1;

Fig. 4 is a transverse sectional view taken on the line 4—4 of Fig. 1;

Fig. 5 is a broken, vertical, longitudinal, sectional view taken mainly on the line 5—5 of Fig. 2;

Fig. 6 is a broken perspective view of the composite tubular bus-bar of the preceding figures, showing the parts thereof separate;

Fig. 7 is a broken perspective view of one of the insulating-supports;

Fig. 8 is a transverse sectional view illustrating another form of composite tubular bus-bar embodying the present invention; and Fig. 9 is a corresponding view of still another form of composite tubular bus-bar embodying the present invention.

The particular embodiment of the present invention herein chosen for illustration in Figs. 1 to 7 inclusive includes a pair of complementary opposed channel-shaped conducting-members 20 and 21, formed of copper or other suitable material of high electrical conductivity, and each comprising a body-portion 22, laterally offsetting from the respective opposite ends of each of which are flanges 23—23 extending in opposition to the similar flanges of the complementary channel-shaped conducting-member. The edge-faces of the flanges 23—23 of one of the conducting-members 20 are spaced from the edge-faces of the flanges of the complementary conducting-member 21 by the cross-reach 24 of a longitudinally-extending key-bar 25 of H-shaped form in cross-section, as shown particularly well in Figs. 2 and 4.

Both of the key-bars 25 correspond, and by virtue of their H-shaped form are provided in each of their respective opposite side-edges with a locking-groove 26, into which the edge-portions of the flanges 23 snugly fit, so that the complementary side-bars 27—27 of each key-bar overlaps upon the adjacent inner and outer surfaces of the flanges 23 of the respective conducting-members 20 and 21.

The respective channel-shaped conducting-members 20 and 21 are forced toward each other, so as to pinch the cross-reach 24 of each key-bar 25 therebetween, by clamping-means which are placed at desired intervals throughout the length of the composite bus-bar structure. The clamping-means for the purpose just described, as shown in Figs. 1, 2 and 4, comprises complementary clamping-bars 28—28 bearing against the outer faces of the body-portions 22 of the conducting-members 20 and 21 and connected together by means of tie-bolts 29—29.

At intervals where it is desired to brace or support the bus-bar, the key-bars 25—25 are interrupted to permit corresponding insulator-heads 30—30, forming the terminals of suitable insulators 31—31, to bear against the outer surfaces of the flanges 23 of the respective channel-shaped conducting-members 20 and 21. Each of the insulator-heads 30 is provided with a T-shaped anchoring-rib 32 providing complementary locking-grooves 33—33 aligned with the locking-grooves 26—26 of the key-bars 25, and like the same, receiving the edge-portions of the adjacent flanges 23 of the conducting-members 20 and 21, preferably with a snug, sliding fit, such as will permit the tubular bus-bar comprising the members 20 and 21 to slide through the said grooves 33—33, as may be required to compensate for the expansion and contraction of the said members.

The interfitting of the flanges 23 with the grooves 33 of the T-shaped anchoring-rib 32, as above described, serves to hold the said members 20—21 against transverse movement with respect to the insulator-heads 30. The respective channel-shaped conducting-members 20 and 21 are retained in engagement with the grooves 33 of the anchoring-ribs 32 by means of two complementary clamping-plates 34—34, drawn together by tie-bolts 35 extending through suitable transverse passages, two of which are formed in each of the insulator-heads 30, as shown.

When the tubular bus-bar expands and contracts, it may slide with respect to the insulator-heads 30—30 and the parts connecting the same, so that no undue strains are set up. Preferably, and as shown, a sufficient space is left between the ends of the key-bars 25 and the adjacent faces of the insulator-heads 30, as indicated, to provide necessary clearance for the expansion of the said bars.

In Figs. 8 and 9, the insulators 36 have their respective heads 37 each provided with a dovetail groove 38 extending in a direction parallel with the direction of the hollow bus and receiving, with a sliding fit, a similarly-shaped rib 39, forming a feature of a slide-block 40. Each of the said slide-blocks may slide back and forth with respect to its complementary insulator-head 37 to permit expansion and contraction of the bus-structure, which latter is clamped in place by complementary clamping-plates 41—41 extending between two complementary slide-blocks 40 and secured thereto by bolts 42.

In Fig. 8 is shown a composite tubular bus-bar formed of four angle-shaped conducting-members 45, each of which has one terminal edge provided with a groove 46, and its other edge provided with a similarly-shaped rib 47. Each of the angle conducting-members 45 corresponds to the others and has its rib 47 entered into a groove 46 in an adjacent member, and its own groove entered by the locking-rib 47 of an adjacent conducting-member.

The composite tubular bus-bar shown in Fig. 9 comprises two opposed channel-shaped conducting-members 48—48, each of which has one of its terminal edges provided with an interlocking-groove 49 and its opposite terminal edge provided with an interlocking-rib 50, the groove of each of the members 48 receiving the rib of the other complementary member, so as to effectively interlock the flanges of each thereof against relative lateral movement.

In all of the forms of composite tubular bus-bars above described, the terminal edge of each of the angular conducting-members is firmly interlocked with the terminal edge of an adjacent conducting-member against lateral displacement with respect thereto, whereby not only is the interior of the tubular bus-bar free of obstructions which might interfere with the longitudinal passage of air therethrough, but when short circuits occur in the bus-system of which the bus-bars may form a part, the very strong and rapidly-pulsating inward mechanical strains set up will be effectively resisted, and no destructive distortion of the bus-member will occur, despite its composite character, nor will objectionable vibrations be set up therein. It will be appreciated in this connection, as before referred to, that the collapsing stresses set up in tubular bus-members when short circuits occur in high-current systems, are apt to be of a destructive magnitude.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. A composite rigid tubular bus-bar comprising a plurality of conducting-members of angular form in cross-section and arranged substantially parallel in opposition to form a flat-sided structure of polygonal form in cross-section and each having at least two integral laterally-extending flange-like portions; the terminal edge of a flange-like portion of one angular conducting-member being interlocked along the major portion of its length to the terminal edge of the flange-like portion of another conducting-member against both inward and outward lateral displacement with respect thereto by means of a groove and an interfitting tongue; and clamping-means urging the said conducting-members toward each other.

2. A composite rigid tubular bus-bar comprising a plurality of conducting-members of angular form in cross-section and arranged substantially parallel in opposition to form a flat-sided structure of polygonal form in cross-section and each having at least two integral laterally-extending flange-like portions; the said angular conducting-members being arranged with respect to each other so that a flange-like portion of one member extends in opposition to the similar portion of another conducting-member; the terminal edge of a flange-like portion of one angular conducting-member being interlocked along the major portion of its length to the terminal edge of the flange-like portion of another conducting-member against both inward and outward lateral displacement with respect thereto by means of a groove and an interfitting tongue; and clamping-means urging the said conducting-members toward each other.

3. A composite rigid tubular bus-bar comprising a plurality of conducting-members of angular form in cross-section and arranged substantially parallel in opposition to form a flat-sided structure of polygonal form in cross-section and each having at least two integral laterally-extending flange-like portions; a longitudinally-extending key-member having two coupling-grooves therein; the terminal edge of a flange-like portion of one angular conducting-member being interlocked to the terminal edge of the flange-like portion of another conducting-member against relative lateral displacement with respect thereto by entering each of the said terminal edges in one of the coupling-grooves of the said key-member; and clamping-means urging the said conducting-members toward each other.

4. A composite rigid tubular bus-bar comprising a plurality of conducting-members of angular form in cross-section and arranged substantially parallel in opposition to form a flat-sided structure of polygonal form in cross-section and each having at least two integral laterally-extending flange-like portions; a longitudinally-extending key-member having two coupling-grooves therein; the said angular conducting-members being arranged with respect to each other so that a flange-like portion of one member extends in opposition to the similar portion of another conducting-member; the terminal edge of a flange-like portion of one angular conducting-member being interlocked to the terminal edge of the flange-like portion of another conducting-member against relative lateral displacement with respect thereto by entering each of the said terminal edges in one of the coupling-grooves of the said key-member; and clamping-means urging the said conducting-members toward each other.

5. A composite rigid tubular bus-bar comprising two channel-shaped conducting-members extending in substantial parallelism with their respective flanges in opposition; the terminal edges of the flanges of one channel-shaped conducting-member being interlocked along the major portion of its length to the opposed terminal edges of the flanges of the other channel-shaped conducting-member against relative inward lateral displacement with respect thereto and clamping-means urging the said conducting-members toward each other.

6. A composite rigid tubular bus-bar comprising two channel-shaped conducting-members extending in substantial parallelism with their respective flanges in opposition; the terminal edges of the flanges of one channel-shaped conducting-member being interlocked along the major portion of its length to the opposed terminal edges of the flanges of the other channel-shaped conducting-member against relative inward lateral displacement with respect thereto by means of a groove and an interfitting tongue and clamping-means urging the said conducting-members toward each other.

7. A composite rigid tubular bus-bar comprising two channel-shaped conducting-members extending in substantial parallelism with their respectively flanges in opposition; a longitudinally-extending key-member; the terminal edges of one channel-shaped conducting-member being interlocked to the opposed terminal edges of the other channel-shaped conducting-member against relative lateral displacement with respect thereto by means of the said key-member and clamping-means urging the said conducting-members toward each other.

8. A composite rigid tubular bus-bar comprising two channel-shaped conducting-members extending in substantial parallelism with their respective flanges in opposition; a longitudinally-extending key-member having complementary grooves on its respective opposite sides; the terminal edges of each of the said channel-shaped conducting-members being anchored to similar portions of the other said conducting-member by being entered into an adjacent groove in the said key-member and clamping-means urging the said conducting-members toward each other.

9. A composite rigid tubular bus-bar comprising two channel-shaped conducting-members extending in substantial parallelism with their respective flanges in opposition; each of the said channel-shaped conducting-members having one terminal edge formed with a coupling-groove and another terminal edge formed with a coupling-rib; the grooved terminal edge of each channel-shaped member receiving the coupling-rib of the other of said members and clamping-means urging said conducting-members toward each other.

RICHARD W. SHOEMAKER.